(12) United States Patent
Watanabe et al.

(10) Patent No.: US 12,377,787 B2
(45) Date of Patent: Aug. 5, 2025

(54) CONSOLE BOX

(71) Applicant: TOYODA GOSEI CO., LTD., Kiyosu (JP)

(72) Inventors: Hiroto Watanabe, Kiyosu (JP); Masanori Mizuno, Kiyosu (JP); Yasuhiro Kodama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 245 days.

(21) Appl. No.: 18/165,971

(22) Filed: Feb. 8, 2023

(65) Prior Publication Data

US 2023/0286440 A1   Sep. 14, 2023

(30) Foreign Application Priority Data

Mar. 11, 2022   (JP) .................................. 2022-038045

(51) Int. Cl.
*B60N 3/00* (2006.01)
*B60R 7/04* (2006.01)

(52) U.S. Cl.
CPC ................ *B60R 7/04* (2013.01); *B60N 3/001* (2013.01)

(58) Field of Classification Search
CPC ..... B60R 7/04; B60R 7/06; B60R 2011/0007; B60N 3/001; B60N 3/002; B60N 2/773; B60N 2/79; B60N 2/793; A47B 5/006
USPC ....... 296/24.34, 37.8, 1.07; 297/145; 108/44
See application file for complete search history.

(56) References Cited

U.S. PATENT DOCUMENTS

| | | | | |
|---|---|---|---|---|
| 5,087,096 A | * | 2/1992 | Yamazaki | A47C 7/70 297/145 |
| 6,086,129 A | * | 7/2000 | Gray | B60R 7/04 296/37.8 |
| 6,279,992 B1 | * | 8/2001 | Plocher | B60N 3/102 297/146 |
| 6,719,367 B2 | * | 4/2004 | Mic | B60R 7/04 297/188.14 |
| 10,065,549 B2 | * | 9/2018 | Saada | B60N 2/64 |

(Continued)

FOREIGN PATENT DOCUMENTS

CN   106671844 A * 5/2017
FR   2974771 A1 * 11/2012

(Continued)

OTHER PUBLICATIONS

Murokawa (JP H09118166 A) (Year: 1997).*

(Continued)

*Primary Examiner* — Amy R Weisberg
*Assistant Examiner* — Wenwei Zhuo
(74) *Attorney, Agent, or Firm* — Posz Law Group, PLC

(57) ABSTRACT

A console box includes a box body, storage, a side table, a shaft, a shaft support arranged above the storage, and a rotation stopper. The storage is located in a side portion of the box body with respect to a widthwise direction of a vehicle seat. The side table is vertically movable between a storage position and an intermediate position. The shaft is located at a lower end of the side table when in the upright state. The shaft support rotatably supports the shaft so that the side table rotates about the shaft away from the box body in the widthwise direction from the intermediate position to a usage position. The rotation stopper restricts rotation of the side table beyond the usage position.

9 Claims, 14 Drawing Sheets

(56) References Cited

U.S. PATENT DOCUMENTS

| | | | | |
|---|---|---|---|---|
| 11,186,373 | B1* | 11/2021 | Elliott | B64D 11/0638 |
| 2006/0220425 | A1* | 10/2006 | Becker | A47C 7/70 |
| | | | | 297/188.16 |
| 2012/0313404 | A1* | 12/2012 | Ackeret | B60N 3/002 |
| | | | | 297/163 |
| 2017/0369173 | A1* | 12/2017 | Lee | B60N 2/79 |
| 2019/0315259 | A1* | 10/2019 | Lee | B60N 3/002 |
| 2020/0077794 | A1* | 3/2020 | Zimmermann | B60N 2/773 |

FOREIGN PATENT DOCUMENTS

| | | | |
|---|---|---|---|
| JP | H02-291809 A | | 12/1990 |
| JP | H09109778 A | * | 4/1997 |
| JP | H09118166 A | * | 5/1997 |
| JP | 2000185584 A | * | 7/2000 |
| JP | 2008-087732 A | | 4/2008 |
| JP | 2015-098211 A | | 5/2015 |

OTHER PUBLICATIONS

Maeda et al. (JP H09109778 A), machine translation (Year: 1997).*
Chen et al. (CN 106671844 A), machine translation (Year: 2017).*
Omori (JP 2000185584 A), image file with machine translation (Year: 2000).*
Office Action mailed Dec. 12, 2023 in corresponding Japanese Patent Application No. 2023-097811 (and English translation).
Office Action mailed Jan. 23, 2024 in corresponding Japanese Patent Application No. 2023-097812 (and English translation).
Office Action mailed Feb. 6, 2024 in corresponding Japanese Patent Application No. 2023-097810 (and English translation).

* cited by examiner

CONSOLE BOX

BACKGROUND

1. Field

The following description relates to a console box.

2. Description of Related Art

In an automobile, a console box for storing small items may be set between adjacent automobile seats (refer to, for example, Japanese Laid-Open Patent Publication No. 2015-98211).

SUMMARY

A conventional console box, including that of the above-mentioned publication, does not provide the vehicle occupant with enough area for performing a simple task in a seated state. Further, it is difficult to provide a flat surface where the vehicle occupant can perform such a task. A simple task refers to a task that can be performed in a state seated in an automobile seat, such as eating, drinking, or operating a computer.

An automobile is mainly used as a means for traveling. Thus, low priority is given to the implementation of a console box that provides sufficient area allowing one to perform a simple task in a state seated on an automobile seat.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a console box set between adjacent vehicle seats includes a box body, storage, a side table, a shaft, a shaft support, and a rotation stopper. The storage is located in a side portion of the box body with respect to a widthwise direction of the vehicle seats and includes an upper end with an opening. The side table includes a surface defining a working surface. The side table is vertically movable between a storage position where the side table is stored in an upright state and an intermediate position where the side table is exposed upward from the storage in the upright state. The shaft is arranged on the side table at a lower end when in the upright state. The shaft extends in a front-rear direction of the vehicle seats. The shaft support is arranged above the storage. The shaft support rotatably supports the shaft so that the side table rotates about the shaft away from the box body in the widthwise direction from the intermediate position to a usage position where the working surface faces upward. The rotation stopper restricts rotation of the side table beyond the usage position.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a console box for an automobile will now be described with reference to FIGS. 1 to 12.

In the description hereafter, the direction in which the automobile moves forward will be referred to as the forward direction, and the direction in which the automobile moves rearward is referred to as the rearward direction. Further, the upper and lower directions of the automobile will be referred to as the vertical directions. The left and right directions, or transverse direction, correspond to the left and right directions of the automobile when the automobile moves forward.

Figure 1:
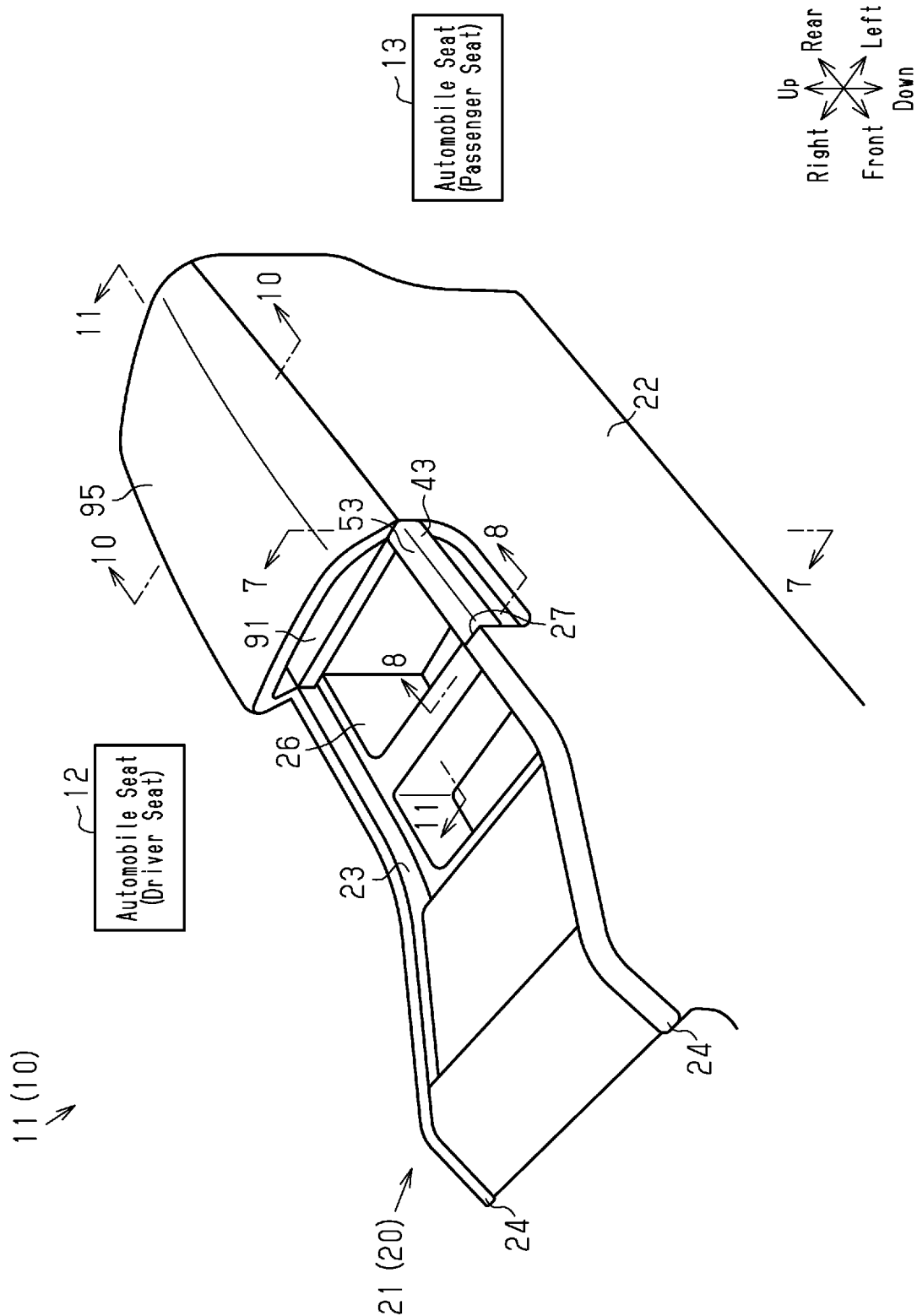
FIG. 1 is a partial perspective view showing a first embodiment of a console box in a state in which a side table is located at a storage position, and a center table and an armrest are both located at a home position.

As shown in FIG. 1, an automobile 10 includes a passenger compartment 11 where two automobile seats 12 and 13, which are front seats, are arranged spaced apart in the transverse direction. The right automobile seat 12 serves as the driver seat where a vehicle occupant (driver) is seated. The left automobile seat 13 serves as a passenger seat where a vehicle occupant (passenger) is seated. The two automobile seats 12 and 13 correspond to vehicle seats.

The two automobile seats 12 and 13 are arranged so that the seatbacks face the front direction. The widthwise direction of the automobile seats 12 and 13 in this arrangement correspond to the left and right directions.

A console box 20 (also referred to as center console, floor console, or the like), which serves as storage having the form of a box, is set between the two automobile seats 12 and 13. Each part of the console box 20 will be described below using a central portion between the automobile seats 12 and 13 in the widthwise direction, or transverse direction, as a reference. With respect to the transverse direction, the direction toward the central portion correspond to the terms of inside, inner, inward, and the like. Further, the direction away from the central portion correspond to the terms of outside, outer, outward, and the like.

Figure 5:
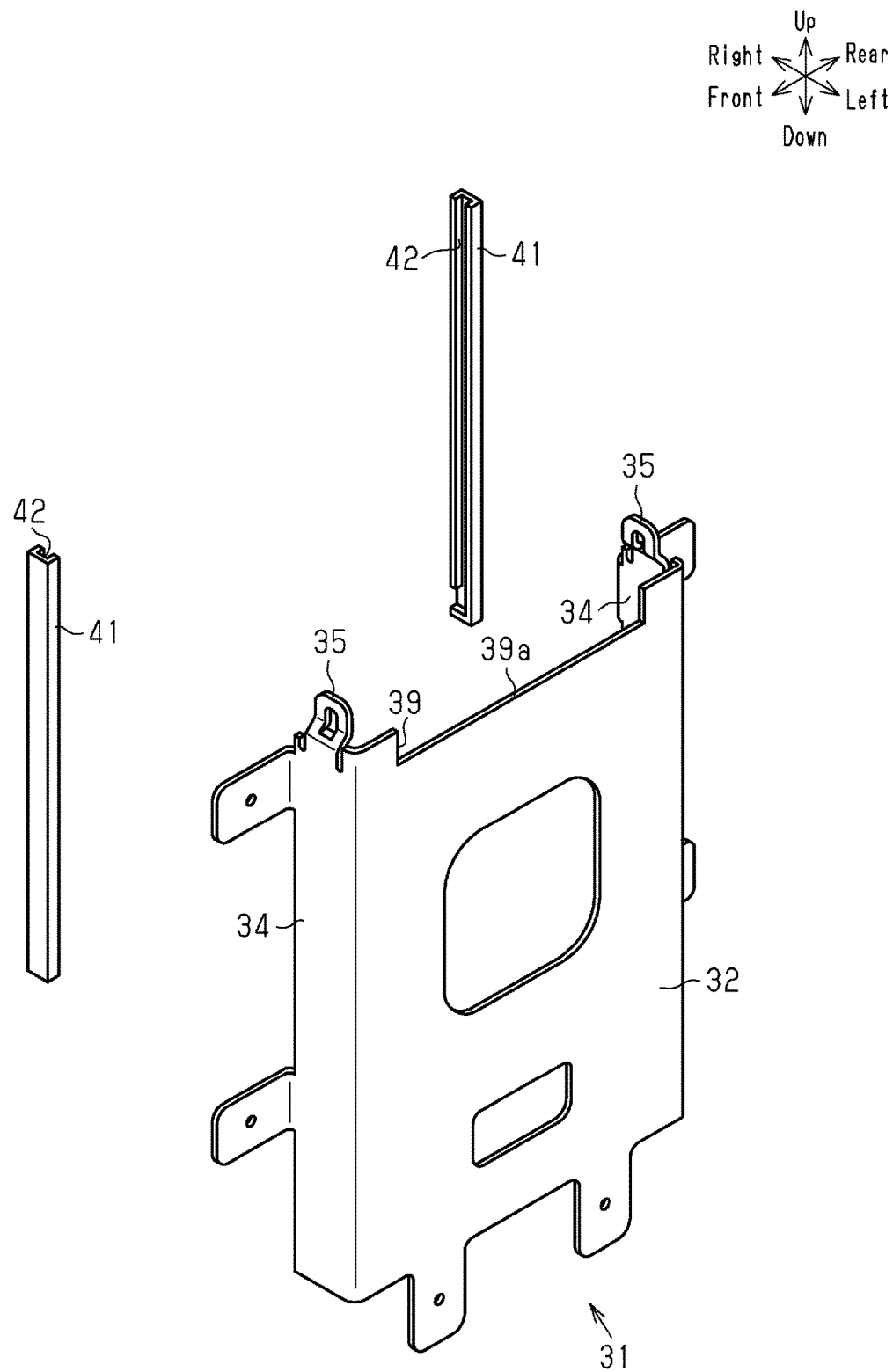
FIG. 5 is an exploded perspective view of a bracket cover and vertical rails.
Figure 7:
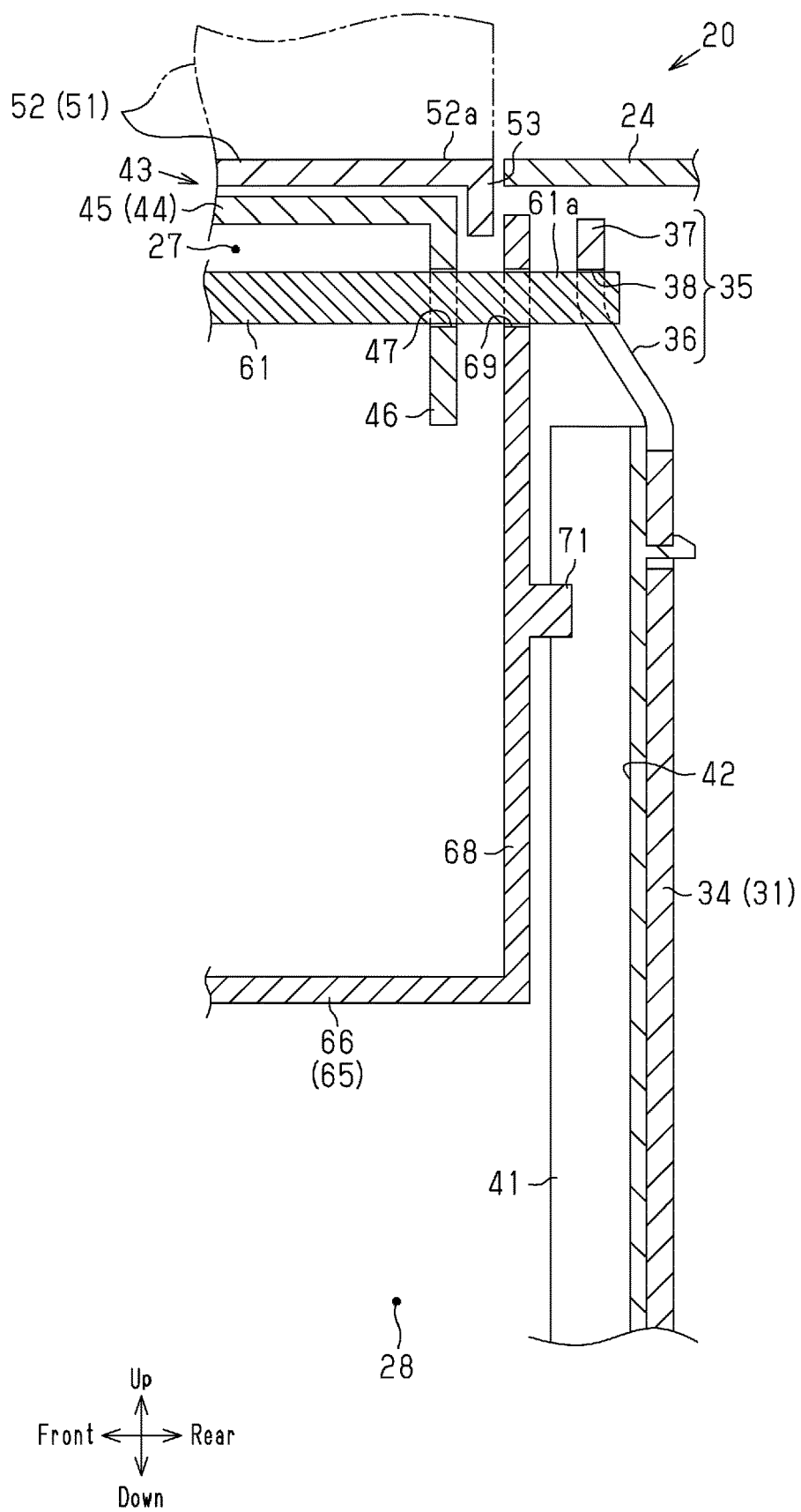
FIG. 7 is a partial, cross-sectional view taken along line 7-7 in FIG. 1.
Figure 8:
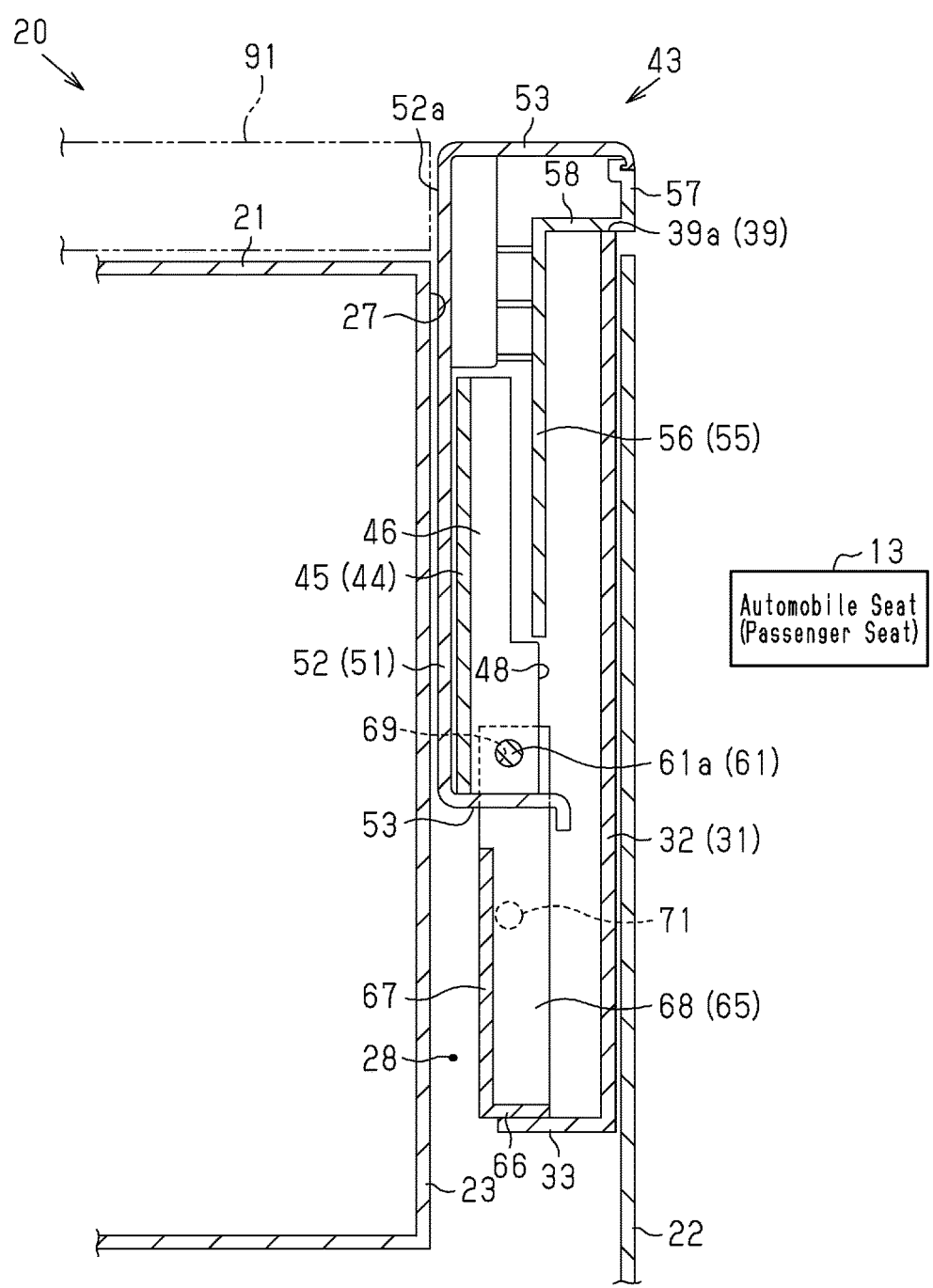
FIG. 8 is a partial, cross-sectional view taken along line 8-8 in FIG. 1.

As shown in FIGS. 5, 7, and 8, the console box 20 includes a box body 21, vertical rails 41, a side table 43, shafts 61a, a retainer 65, shaft supports 35, and a rotation stopper 39a. Each of the above parts will now be described.

Box Body 21

Figure 10:
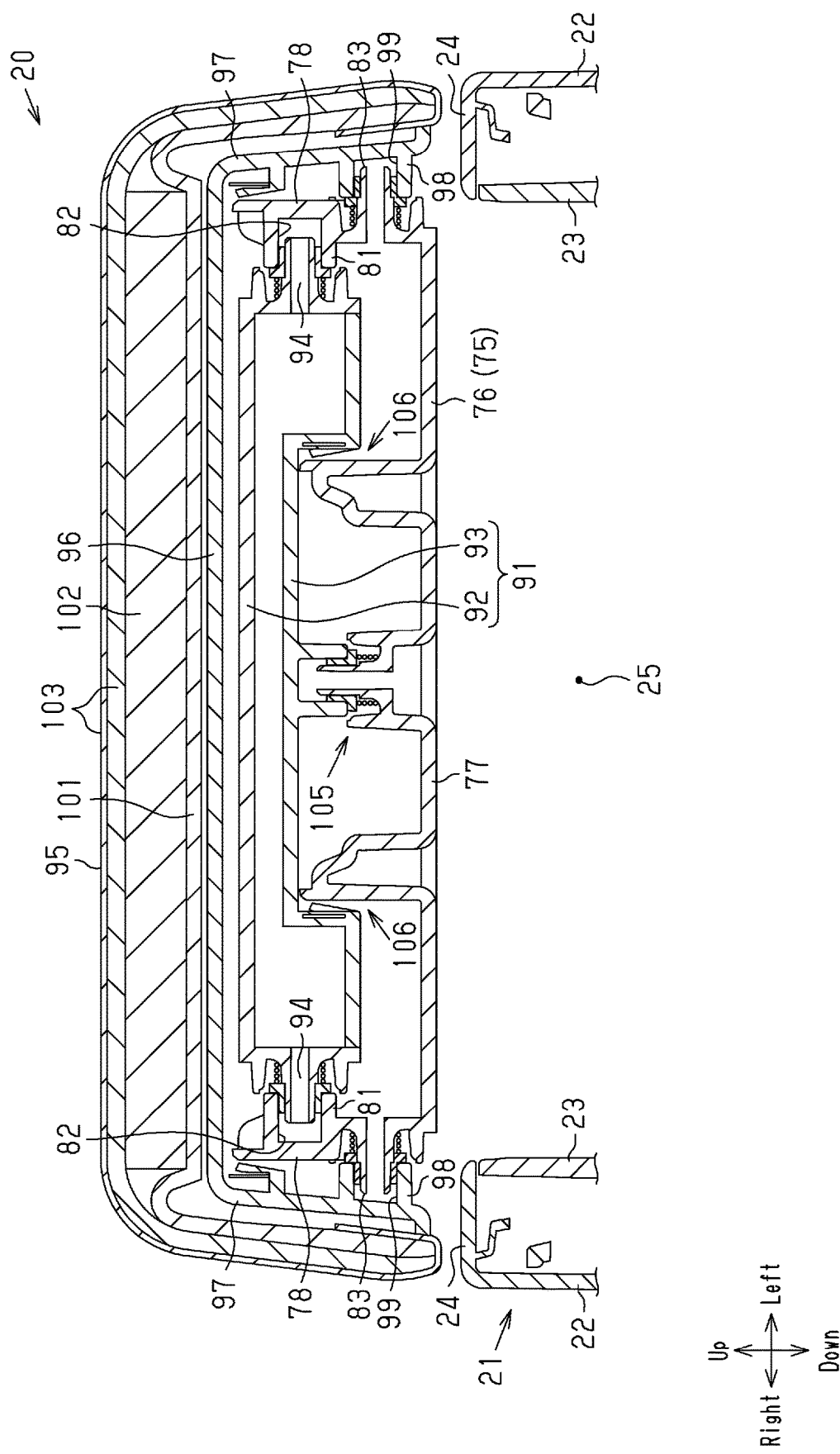
FIG. 10 is a partial, cross-sectional view taken along line 10-10 in FIG. 1.

As shown in FIGS. 1 and 10, the box body 21 forms the frame of the console box 20 and is, for example, made of plastic and longer in the front-rear direction than the transverse direction.

Outer side walls 22 are provided at the left and right sides of the box body 21. An inner side wall 23 is formed at a location spaced apart inwardly from each outer side wall 22. A cavity 25 having an upper open end and a relatively large volume is formed between the rear portions of the two inner side walls 23 (refer to FIG. 11). A cavity 26 having an upper open end and a smaller volume than the cavity 25 is formed next to the front side of the cavity 25 between the two inner side walls 23.

An upper wall 24 is formed in most of the portion between the upper ends of adjacent ones of the outer side wall 22 and the inner side wall 23 in the front-rear direction.

As shown in FIGS. 1 and 8, storage 28, including an upper end with an opening 27, is arranged between the set of adjacent ones of the outer side wall 22 and the inner side wall 23 located at the left side or the right side of the cavity 26 (left side in first embodiment). A bracket cover 31 is disposed in the storage 28. That is, the console box 20 includes the bracket cover 31. The bracket cover 31 is formed by bending sheet metal or the like and has greater strength than the outer side wall 22 and the inner side wall 23.

As shown in FIGS. 5 and 8, the bracket cover 31 includes a body plate 32, a bottom plate 33, and two opposing plates 34. The body plate 32 is disposed adjacent to the right side of the outer side wall 22. The bottom plate 33 projects inward (rightward) from the lower edge of the body plate 32. The opposing plates 34 project inward (rightward) from the front edge and rear edge of the body plate 32. The two opposing plates 34 are parallel and oppose each other in the front-rear direction.

Vertical Rails 41

As shown in FIGS. 5 and 7, the vertical rails 41 are disposed next to the rear side of the front opposing plate 34 and next to the front side of the rear opposing plate 34. Each vertical rail 41 includes a vertical guide groove 42 extending in the vertical direction. The front vertical guide groove 42 opens in the rear end surface and the upper end surface of the front vertical rail 41. The rear vertical guide groove 42 opens in the front end surface and the upper end surface of the vertical rail 41.

Side Table 43

Figure 4:
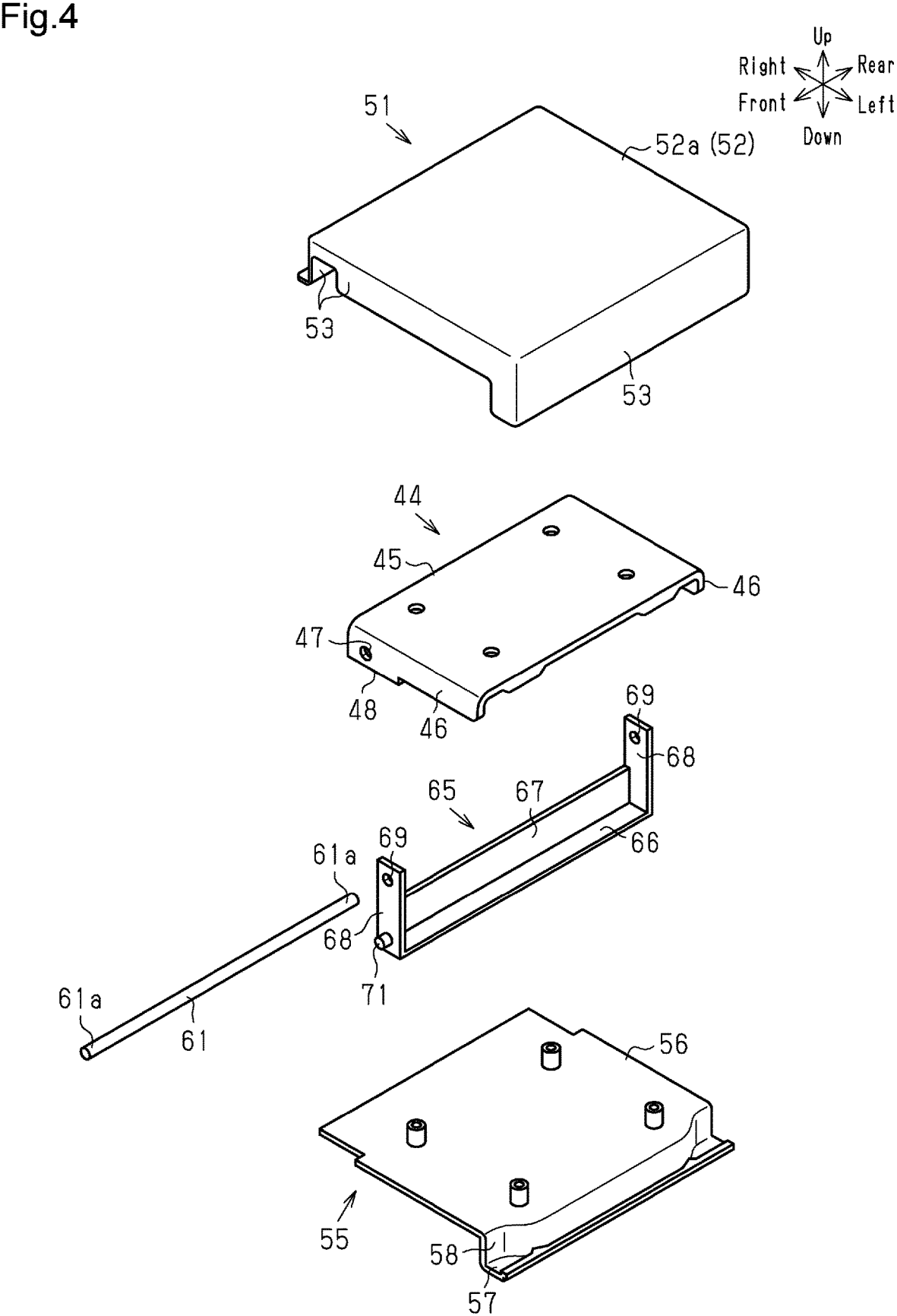
FIG. 4 is an exploded perspective view of the side table, a shaft, and a retainer.

As shown in FIGS. 4 and 8, the side table 43 is structured to sandwich a table bracket 44 between an outer table member 51 and an inner table member 55. The outer table member 51 and the inner table member 55 are formed from, for example, plastic.

The outer table member 51 includes a working plate 52 and side plates 53 formed on the four sides of the working plate 52. The side of the working plate 52 farther from the inner table member 55 forms the outer surface of the side table 43. The outer surface is flat and defines a working surface 52a on which a simple task can be performed.

The inner table member 55 includes a main plate 56, an auxiliary plate 57, and a connecting plate 58. The main plate 56 and the auxiliary plate 57 are each separated from the working plate 52 and parallel to the working plate 52. The distance between the working plate 52 and the main plate 56 is less than that between the working plate 52 and the auxiliary plate 57. The connecting plate 58 extends orthogonal to the working plate 52 and couples the main plate 56 to the auxiliary plate 57.

The table bracket 44, which is formed by bending sheet metal or the like, has greater strength than the outer table member 51 and the inner table member 55. The table bracket 44 includes a main plate 45, which has the form of a quadrangular plate, and two opposing plates 46, which are parallel and spaced apart from each other in the front-rear direction. The opposing plates 46 are orthogonal to the main plate 45 and respectively connected to the front edge and the rear edge of the main plate 45. The opposing plates 46 are each longer in the direction in which the front edge and the rear edge extend than in the direction orthogonal to the main plate 45. An insertion hole 47 extends through each opposing plate 46 at one of the ends in the direction in which the front edge and the rear edge extend. The edge of each opposing plate 46 at the side opposite the main plate 45 defines a flat contact surface 48 at the same end as the insertion hole 47.

Shaft 61a

A metal bar 61 extending in the front-rear direction is inserted through the two insertion holes 47 of the table bracket 44. The front end and rear end the bar 61 define the shafts 61a. The front shaft 61a projects frontward out of the front opposing plate 46. The rear shaft 61a projects rearward out of the rear opposing plate 46.

Retainer 65

The retainer 65 assists vertical movement of the side table 43 between a storage position and an intermediate position, which will be described later. Further, the retainer 65 assists rotation of the side table 43 between the intermediate position and a usage position. As shown in FIGS. 4, 7, and 8, the retainer 65 is disposed in the storage 28 in a manner movable in the vertical direction.

The retainer 65 includes a bottom plate 66, a side plate 67, and front and rear opposing plates 68. The bottom plate 66 extends horizontally in the front-rear direction above the bottom plate 33 of the bracket cover 31. The side plate 67 extends upright in the front-rear direction. The lower edge of the side plate 67 is connected to the bottom plate 66.

The opposing plates 68 are parallel and spaced apart from each other in the front-rear direction. The opposing plates 68 are flat plates that are longer in the vertical direction than the transverse direction. The front opposing plate 68 is fixed to the front end of the bottom plate 66 and the front end of the side plate 67. The rear opposing plate 68 is fixed to the rear end of the bottom plate 66 and the rear end of the side plate 67.

An insertion hole 69 extends through the upper portion of each opposing plate 68 in the front-rear direction. The front shaft 61*a* is inserted through the front insertion hole 69. The rear shaft 61*a* is inserted through the rear insertion hole 69. Thus, the upper end of the retainer 65 is coupled by the two shafts 61*a* to the table bracket 44 in a foldable manner.

The front shaft 61*a* projects frontward out of the front opposing plate 68 of the retainer 65. The rear shaft 61*a* projects rearward out of the rear opposing plate 68 of the retainer 65. The front and rear shafts 61*a* are each inserted into the vertical guide groove 42 of the corresponding vertical rail 41 in a manner slidable in the vertical direction.

A pin 71 projects frontward from the front opposing plate 68 below the insertion hole 69. The pin 71 is inserted into the vertical guide groove 42 of the front vertical rail 41 in a manner slidable in the vertical direction. A pin 71 projects rearward from the rear opposing plate 68 below the insertion hole 69. The pin 71 is inserted into the vertical guide groove 42 of the rear vertical rail 41 in a manner slidable in the vertical direction.

Shaft Support 35

Figure 6:
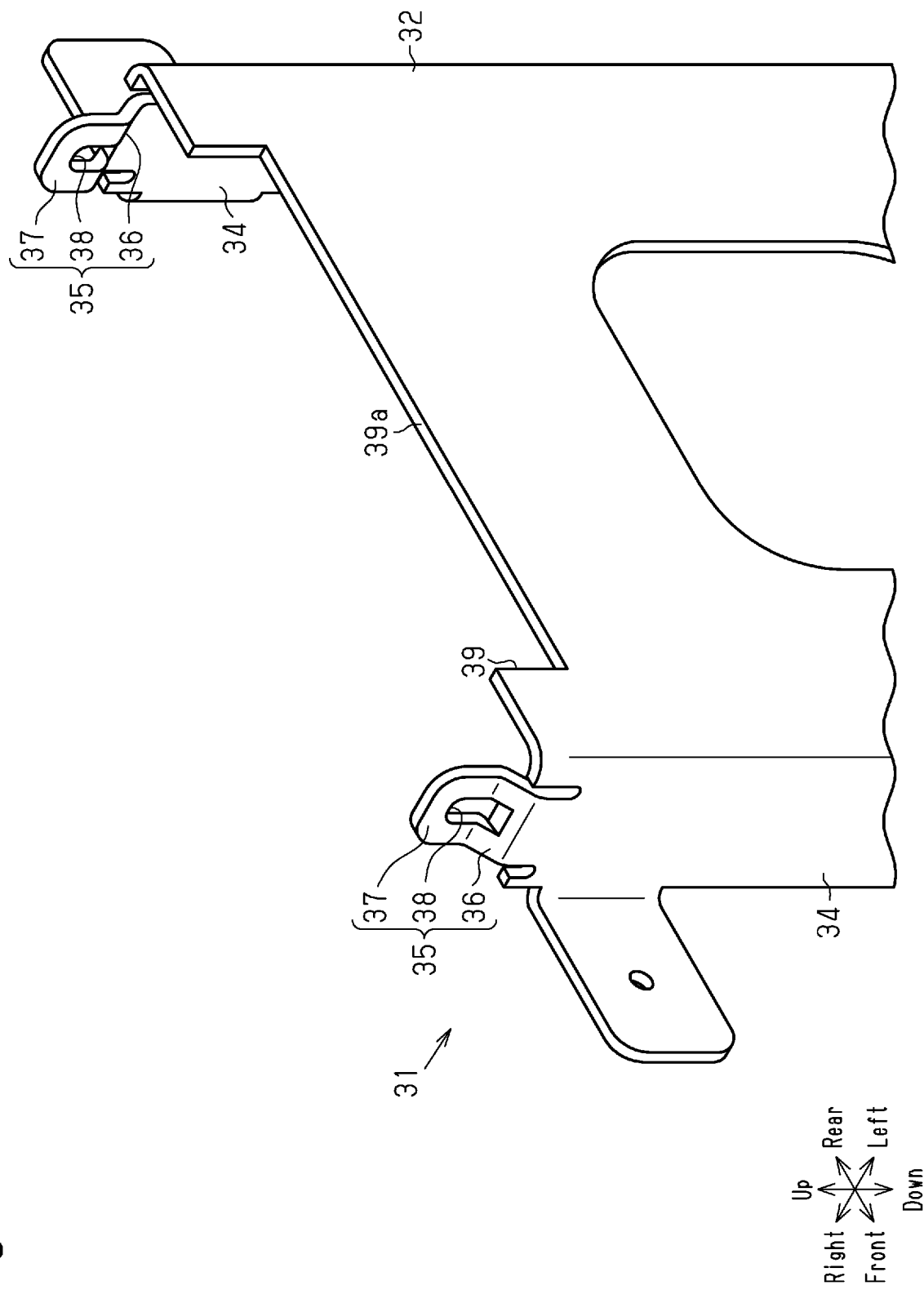
FIG. 6 is an enlarged, partial perspective view of an upper portion in the bracket cover shown in FIG. 5.

As shown in FIGS. 6 and 7, the shaft support 35 is formed on the upper end of each opposing plate 34 of the bracket cover 31. The two shaft supports 35 each include a slope 36 and a bearing 37. The slopes 36 of the two shaft supports 35, extending from the upper ends of the corresponding opposing plates 34, are inclined toward each other in the front-rear direction. The bearings 37 extend upward from the upper ends of the slopes 36. Each bearing 37 is located above the corresponding vertical guide groove 42. Each shaft support 35 includes a support hole 38 elongated in substantially the vertical direction across the slope 36 and the bearing 37. The support hole 38 has a width that is slightly greater than the diameter of the shaft 61*a*.

Rotation Stopper 39*a*

Figure 9:
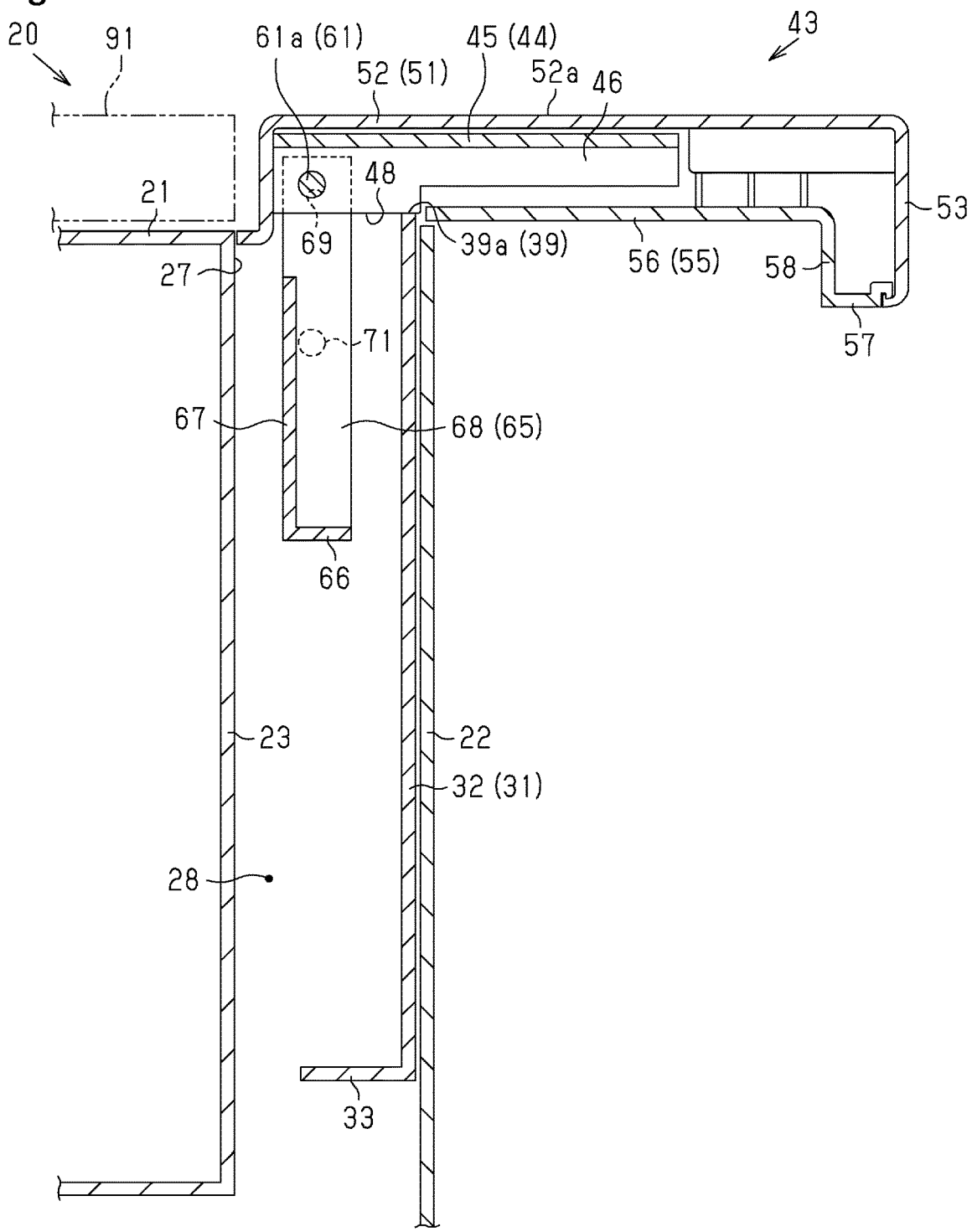
FIG. 9 is a partial, cross-sectional view taken along line 9-9 in FIG. 2.

As shown in FIGS. 6 and 9, the body plate 32 of the bracket cover 31 includes a cutout portion 39 in the upper end. The bottom of the cutout portion 39 serves as the rotation stopper 39*a* that contacts the contact surface 48 of the table bracket 44 and restricts rotation of the side table 43.

Positions of Side Table 43

The side table 43 is movable between three positions. The three positions are a storage position, an intermediate position, and a usage position.

Figure 2:
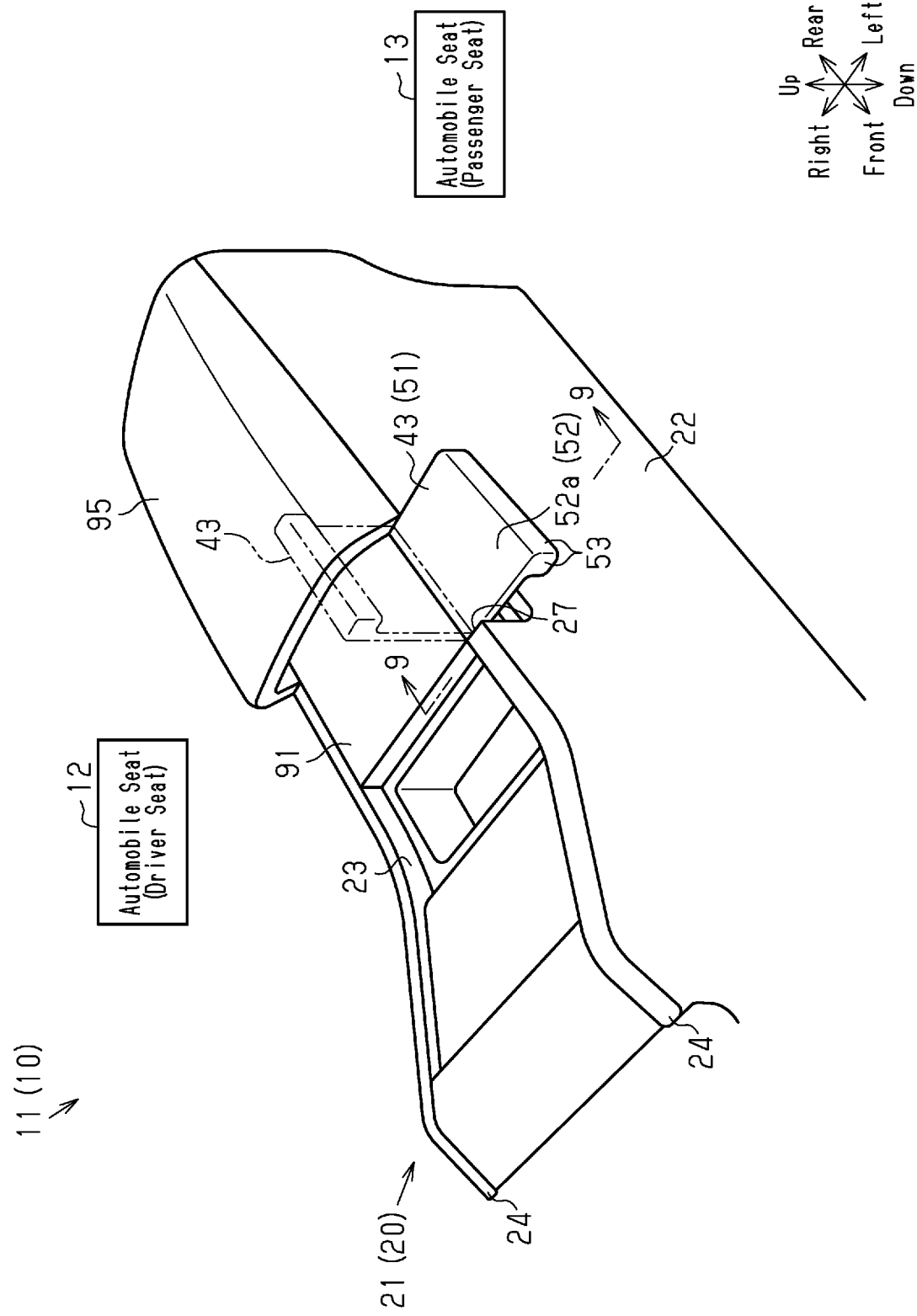
FIG. 2 is a partial perspective view of the console box in a state in which the side table is moved to a usage position and the center table is moved to an extended position from the positions shown in FIG. 1.
Figure 3:
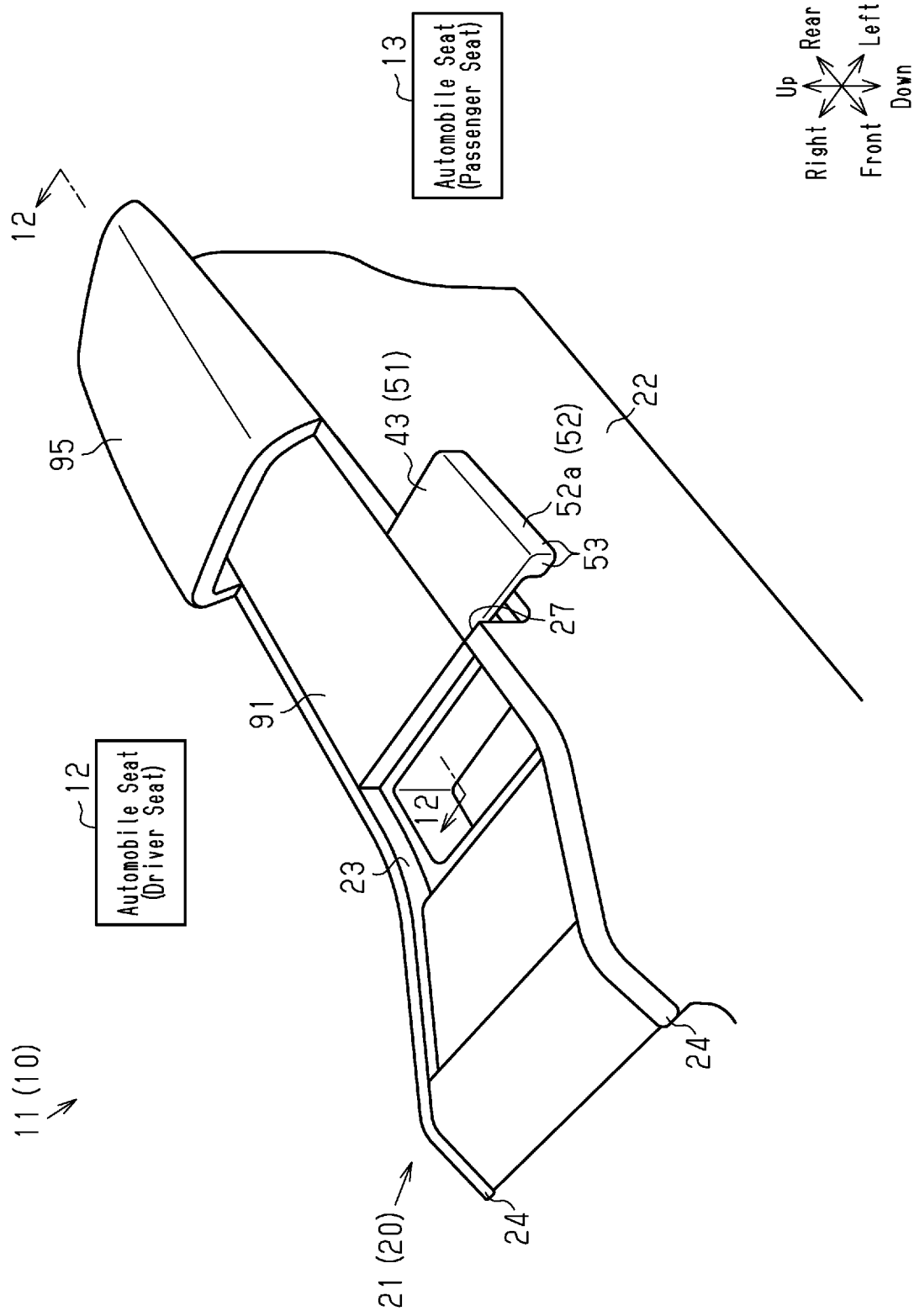
FIG. 3 is a partial perspective view of the console box in a state in which the arm rest is also moved to an extended position from the position shown in FIG. 2.

As shown in FIGS. 1 and 8, at the storage position, the side table 43 is stored in the storage 28 in an upright state. At the intermediate position, the side table 43 is exposed upward from the storage 28 in the upright state as shown by the double-dashed lines in FIGS. 2 and 7. Further, at the intermediate position, the shafts 61*a* are rotatably supported by the shaft supports 35 (refer to FIG. 7). As shown in FIGS. 2, 3, and 9, at the usage position, the side table 43 closes the opening 27 of the storage 28 and projects horizontally toward the left from the upper end of the box body 21.

Figure 11:
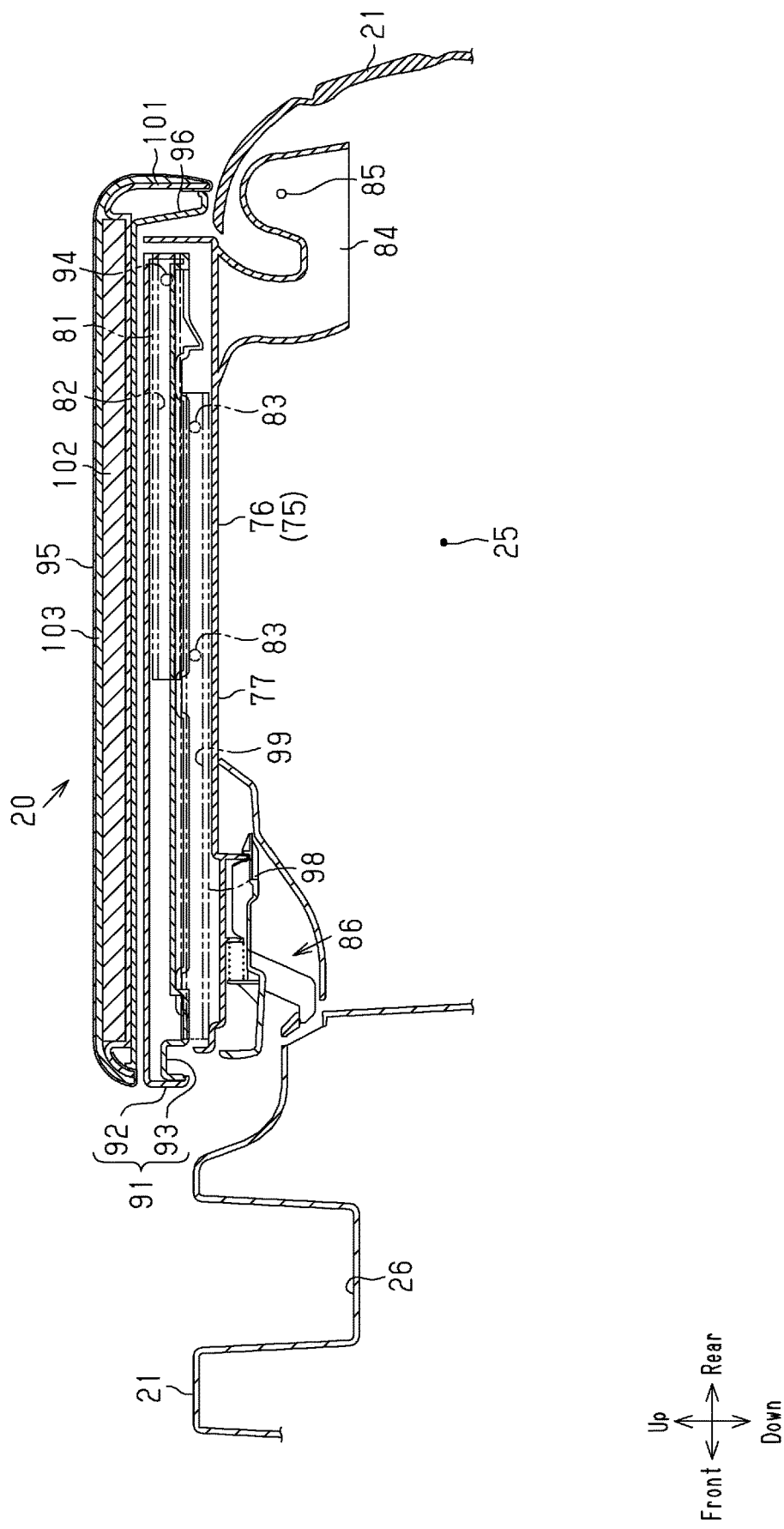
FIG. 11 is a partial, cross-sectional view taken along line 11-11 in FIG. 1.
Figure 12:
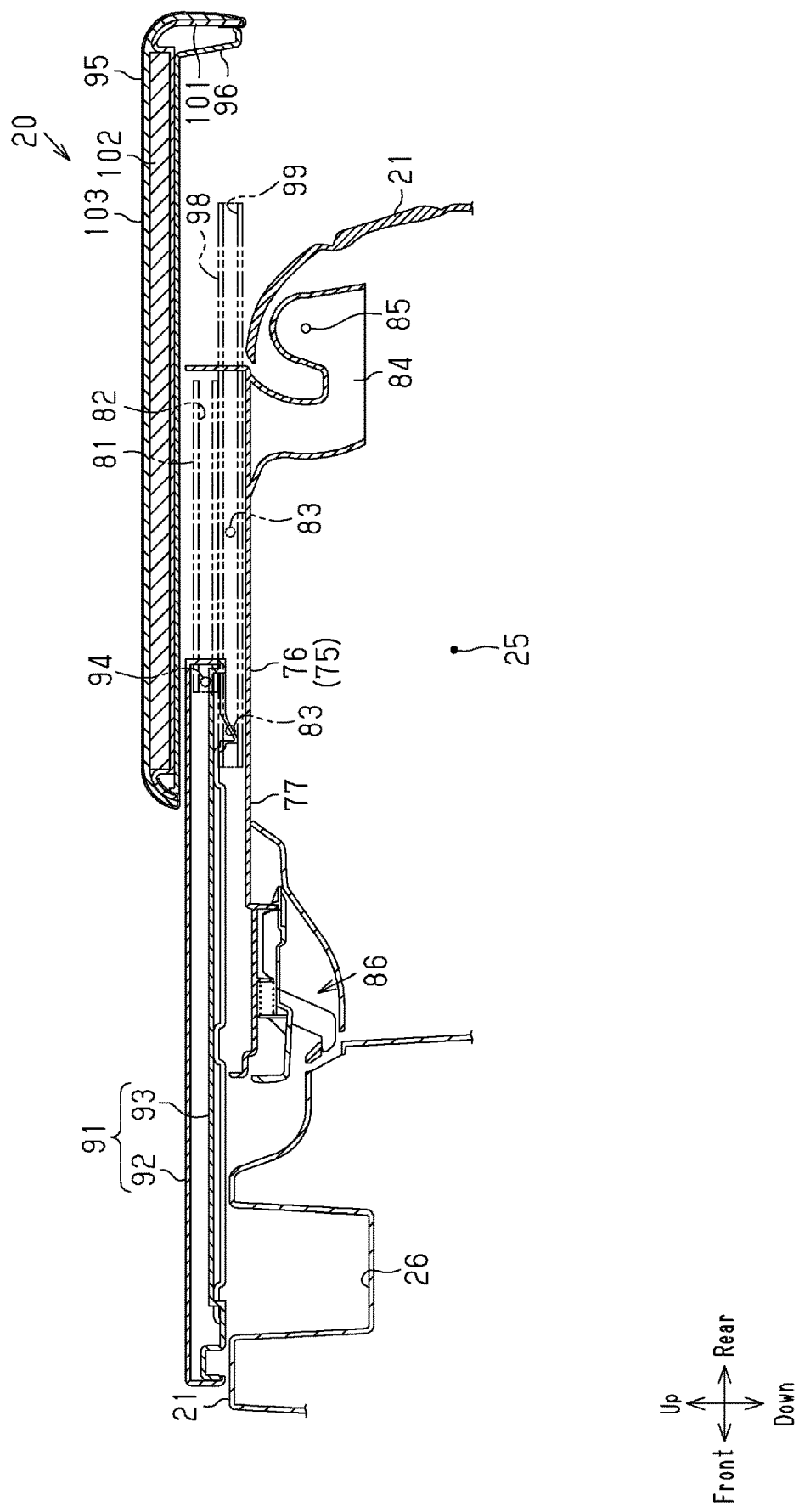
FIG. 12 is a partial, cross-sectional view taken along line 12-12 in FIG. 3.

In addition to the structure described above, the console box 20 includes a hinge 75, a center table 91, and an armrest 95, as shown in FIGS. 10 to 12. Each of the above parts will now be described.

Hinge 75

The hinge 75 includes a base 76 and two supports 84. The base 76 includes a bottom plate 77 that is rectangular in plan view. The base 76 includes left and right side plates 78 (refer to FIG. 10).

An inner lateral rail 81 is formed on the upper inner surface of each side plate 78. The inner lateral rail 81 includes an inner lateral groove 82 extending in the front-rear direction. The inner lateral groove 82 opens inwardly.

Projections 83 are formed on the lower outer surface of each side plate 78 projecting outwardly at a number of, for example, two, locations in the front-rear direction.

The supports 84 are arranged below the left and right sides of the rear portion of the base 76. The front upper end of each support 84 is coupled to the corresponding side of the rear portion of the base 76. A shaft 85 extends from the rear end of each support 84 in the transverse direction. The hinge 75 is supported by each shaft 85 in the rear portion of the box body 21. The hinge 75 is rotatable between a closed position where the base 76 closes the opening of the cavity 25 (refer to FIG. 11) and an open position where the base 76 opens the opening (not shown).

A latch mechanism 86 is arranged below the front portion of the base 76 (refer to FIGS. 11 and 12). When the hinge 75 is located at the closed position, the latch mechanism 86 locks the hinge 75 to the box body 21 and restricts rotation of the hinge 75 about the shafts 85. When the hinge 75 is unlocked, the hinge 75 is allowed to rotate about the shafts 85.

Center Table 91

The center table 91 includes an upper table 92 and a lower table 93 arranged one above the other. The center table 91 is formed by coupling the upper table 92 and the lower table 93. The center table 91 is rectangular and larger in the front-rear direction than the transverse direction (refer to FIG. 3). The center table 91 is located above the space between the two inner side walls 23.

Projections 94 project outwardly from the left and right sides of the center table 91. The projections 94 are inserted into the inner lateral grooves 82 of the inner lateral rails 81 in a manner slidable in the front-rear direction.

The center table 91 is slidable between a home position and an extended position. As shown in FIGS. 1 and 11, at the home position, most of the center table 91 is located above the base 76. Further, at the home position, the center table 91 is located rearward from the storage 28. As shown in FIGS. 2 and 12, at the extended position, the front portion of the center table 91 is located frontward from the base 76.

As shown in FIG. 9, when the side table 43 is located at the usage position and the center table 91 is located at the extended position, the upper surface of the center table 91 is flush with the working surface 52*a* of the side table 43. Further, as shown in FIG. 8, when the side table 43 is located at the storage position and the center table 91 is located at the extended position, the upper surface of the center table 91 is flush with the outer surface (upper surface) of one of the side plates 53 of the side table 43.

Armrest 95

As shown in FIGS. 10 to 12, the frame of the armrest 95 includes an inner armrest piece 96 and an outer armrest piece 101 covering the inner armrest piece 96. A pad 102 is arranged on the outer armrest piece 101. Further, a cover 103 covers the outer armrest piece 101 and the pad 102.

The inner armrest piece 96 includes left and right side plates 97 (refer to FIG. 10). An outer lateral rail 98 is formed on the lower inner surface of each side plate 97. Each outer lateral rail 98 includes an outer lateral guide groove 99 extending in the front-rear direction. Each outer lateral guide groove 99 opens inwardly. Each projection 83 of the hinge 75 is inserted into the corresponding outer lateral guide groove 99. The positions of the projections 83 in the outer lateral guide grooves 99 of the inner armrest piece 96 are changed to slide the armrest 95 between the home position and the extended position.

As shown in FIGS. 1, 2, and 11, at the home position, most of the armrest 95 is located above the base 76 of the hinge 75. As shown in FIGS. 3 and 12, at the extended position, the rear portion of the armrest 95 is located rearward from the base 76.

As shown in FIG. 10, a mechanism 105 is arranged between the hinge 75 and the center table 91 to stably hold the center table 91 in the lateral direction. Further, mechanisms 106 are arranged between the hinge 75 and the center table 91 to hold the center table 91 in place when moved to the home position or the extended position.

The operation and advantages of the first embodiment will now be described.

The side table 43 is vertically movable between the storage position and the intermediate position and rotatable between the intermediate position and the usage position.

(1) No Simple Task Performed (1-1) In this case, as shown in FIGS. 1 and 8, the vehicle occupant arranges the side table 43 at the storage position. At the storage position, the bottom plate 66 of the retainer 65 contacts the bottom plate 33 of the bracket cover 31 and thereby restricts further downward movement of the retainer 65. Further, the connecting plate 58 of the inner table member 55 contacts the rotation stopper 39a of the bracket cover 31. This restricts downward movement of the inner table member 55. The opening 27 of the storage 28 is closed by the side table 43. The upper surface of one of the side plates 53 of the side table 43 is flush with the portion of the upper wall 24 of the box body 21 bordering the side plate 53. The shafts 61a are located downward from the shaft supports 35 and downward from the opening 27 of the storage 28. Further, the contact surface 48 of the table bracket 44 is separated downwardly in the storage 28 from the rotation stopper 39a.

In this manner, most of the side table 43 is hidden in the storage 28. Thus, the side table 43 will not be an interference.

(1-2) Further, in this case, as shown in FIGS. 1 and 11, the vehicle occupant arranges the hinge 75 at the closed position. The center table 91 and the armrest 95 are each located at the home position. At the home position, the center table 91 and the armrest 95 are both located above the base 76 of the hinge 75. In this state, the center table 91 is entirely covered by the armrest 95, that is, stored between the armrest 95 and the base 76. Thus, the center table 91 will not be an interference.

The opening of the cavity 25, which has a large volume, at the rear portion of the box body 21 is covered by the base 76 of the hinge 75, the center table 91, and the armrest 95.

The vehicle occupant can place an elbow on the armrest 95 to reduce the load on the arm and shoulder.

Further, the opening of the cavity 26 in the front portion of the box body 21 is open. Thus, small items can be placed in the cavity 26 through the opening. In other words, the cavity 26 can be used to store small items.

(2) Performing Simple Task on Side Table 43

In this case, the vehicle occupant first moves the side table 43 from the storage position to the intermediate position and then moves the side table 43 to the usage position.

(2-1) When moving the side table 43 from the storage position to the intermediate position, the vehicle occupant, for example, holds the side table 43 at the portion (upper end) that is exposed from the storage 28 in the storage position and lifts the side table 43. This exposes the side table 43 upward from the storage 28.

As shown in FIGS. 7 and 8, the retainer 65 is coupled to the table bracket 44 of the side table 43 by the bar 61. Thus, as the side table 43 rises, the retainer 65 rises together with the side table 43. The shafts 61a and the pins 71 also slide upward in the vertical guide grooves 42 of the corresponding vertical rails 41. The vertical rails 41 restrict movement of the shafts 61a and the pins 71 to the vertical direction. This allows the side table 43 and the retainer 65 to be lifted stably and smoothly.

(2-2) Further lifting of the side table 43 moves the shafts 61a out of the corresponding vertical guide grooves 42. The shaft supports 35, which include the support holes 38, are formed above the vertical rails 41. The bearings 37 are located above the vertical guide grooves 42. Thus, as the side table 43 rises, the shafts 61a move from the guide grooves 42 into the support holes 38 and slides upward along the support holes 38.

As shown by the double-dashed lines in FIGS. 2 and 7, when the side table 43 is lifted to the intermediate position, each shaft 61a comes into contact with the upper end of the wall defining the support hole 38 in the corresponding bearing 37. This restricts further upward movement of the side table 43. In this state, the shafts 61a are rotatably supported by the shaft support 35.

At the intermediate position, most of the side table 43 is exposed upward from the storage 28 in an upright state. The contact surface 48 of the table bracket 44 is still separated from the rotation stopper 39a.

The retainer 65 is located in the upper portion of the storage 28 in the upright state. The pins 71 are located in the vertical guide grooves 42. The bottom plate 66 of the retainer 65 is separated in the upward direction from the bottom plate 33 of the bracket cover 31.

(2-3) When moving the side table 43 from the intermediate position to the usage position, the side table 43 is rotated about the two shafts 61a downward in the left direction away from the box body 21 in the widthwise direction of the automobile seat 13. In this state, the shafts 61a are supported by the bearings 37 and stably holds the shafts 61a in position. When the side table 43 is rotated, the working surface 52a and the contact surface 48 are both pivoted about the two shafts 61a.

(2-4) As shown in FIGS. 2, 7, and 9, when the side table 43 is rotated to the usage position, the shafts 61a are still supported by the shaft supports 35. The opening 27 remains closed by the side table 43. Further, the contact surface 48 of the table bracket 44 comes into contact with the rotation stopper 39a of the bracket cover 31. This restricts further downward rotation of the side table 43 beyond the usage position. The working surface 52a of the side table 43 is horizontal and faces upward. This allows the vehicle occupant to perform a simple task on the working surface 52a of the side table 43 while sitting on the automobile seat 13.

In this manner, to perform a simple task in a state seated on the automobile seat 13, the vehicle occupant moves the side table 43 from the storage position to the usage position in order to form an area where a simple task can be performed.

- (2-5) The table bracket 44 and the bracket cover 31 are both formed from sheet metal and have high strength. Thus, even if a downward load is applied to the side table 43 at the usage position when a simple task is performed, the shaft supports 35 and the rotation stopper 39a will not be deformed, and the side table 43 can easily be kept at the usage position.
- (2-6) In a state seated on the automobile seat 13, the vehicle occupant reverses the procedures described above in paragraphs (2-1) to (2-4). This reverses the movements of the side table 43 described above. Thus, the vehicle occupant can return the side table 43 via the intermediate position to the storage position.

In particular, when lowering the side table 43 from the intermediate position to the storage position, the side table 43 is rotated to be upright above the storage 28 and then lowered.

This moves the shafts 61a from the support holes 38 to the vertical guide grooves 42 located below. The retainer 65, which is coupled by the two shafts 61a, to the side table 43 is lowered together with the side table 43 into the storage 28.

The shafts 61a and the pins 71 slide downward along the vertical guide grooves 42. The vertical rails 41 restrict movement of the shafts 61a and the pins 71 to the vertical direction. This allows the side table 43 and the retainer 65 to be lowered stably and smoothly.

When the side table 43 is lowered to the storage position, as shown in FIG. 8, the bottom plate 66 of the retainer 65 comes into contact with the bottom plate 33 of the bracket cover 31 from above. This restricts downward movement of the retainer 65. Further, the connecting plate 58 of the inner table member 55 contacts the rotation stopper 39a of the bracket cover 31. This restricts downward movement of the inner table member 55.

(3) Expanding Working Area

- (3-1) To expand the working area when the side table 43 is located at the usage position, for example, as shown in FIGS. 1 and 11, the vehicle occupant pulls out the front end of the center table 91 forward from the home position. As shown in FIG. 2, the exposes the front portion of the center table 91 frontward from the armrest 95, which is located at the home position, and the base 76 of the hinge 75, which is located at the closed position (refer to FIG. 12).

In this case, the projections 94 slide forward along the inner lateral grooves 82 of the corresponding inner lateral rails 81. The inner lateral rails 81 restrict movement of the projections 94 to the front-rear direction. This allows the center table 91 to slide forward stably and smoothly.

- (3-2) When the center table 91 is pulled to the extended position, the opening of the cavity 26 is covered by the front portion of the center table 91 (refer to FIG. 12). At the extended position, the front portion of the center table 91 is adjacent to the right side of the storage 28.

In this state, the side table 43 is located at the usage position, and the opening 27 of the storage 28 is closed by the side table 43.

Accordingly, the working surface 52a of the side table 43 and the upper surface of the front portion of the center table 91 can be used by the vehicle occupant as an area for performing a simple task while sitting on the automobile seat 13. This further expands the working area toward the right.

Further, in this state, the rear half of the center table 91 is covered by the armrest 95 from above.

- (3-3) At the extended position, as shown by the double-dashed lines in FIG. 9, the upper surface of the center table 91 is flush with the working surface 52a of the side table 43, which is at the usage position. Thus, the center table 91 is even with the side table 43. This allows the vehicle occupant to perform a simple task across the side table 43 and the center table 91.
- (3-4) In a state seated on the automobile seat 13, the vehicle occupant reverses the procedures described above in paragraphs (3-1) and (3-2). This reverses the movement of the center table 91 described above. Thus, the vehicle occupant can return the center table 91 from the extended position to the home position. As shown in FIG. 11, at the home position, the center table 91 is entirely covered by the armrest 95 and has no exposed portions. Further, the working area is no longer expanded by the center table 91. The working area is provided by only the working surface 52a of the side table 43.

In this manner, the working area can be expanded or reduced by sliding the center table 91 in the front-rear direction.

- (3-5) To further expand the working space toward the rear, when the side table 43 is located at the usage position and the center table 91 is located at the extended position, rearward force is applied to the armrest 95.

Consequently, the portion of the center table 91 covered by the armrest 95 becomes exposed as shown in FIGS. 3 and 12. The exposed portion expands the working area toward the rear. When the armrest 95 is moved to the extended position, the exposed area of the center table 91 becomes the maximum. The rear end of the center table 91 is covered by the armrest 95 from above.

When the armrest 95 is moved rearward, as shown in FIGS. 10 and 12, the outer lateral rails 98 of the armrest 95 restrict movement of the projections 83 of the hinge 75 to the front-rear direction. The position of the projections 83 in the outer lateral guide grooves 99 is changed to slide the armrest 95 stably and smoothly.

- (3-6) In a state seated on the automobile seat 13, the vehicle occupant reverses the procedures described above in paragraph (3-5) to reverse the movement of the armrest 95 described above. Thus, the vehicle occupant can return the armrest 95 from the extended position to the home position.

(4) Other Advantages

- (4-1) In the first embodiment, the center table 91 and the armrest 95 are coupled to the hinge 75 in a manner slidable in the front-rear direction. This allows the armrest 95 and portions near the armrest 95 to be smaller in size than when the center table 91 and the armrest 95 are coupled to separate members in a manner slidable in the front-rear direction.

Second Embodiment

A second embodiment of the console box 20, which is for an automobile, will now be described with reference to FIGS. 13 to 16.

The second embodiment uses a spring 114 and an engagement portion 117 instead of the rotation stopper 39a of the first embodiment. The combination of the spring 114 and the engagement portion 117 may be provided on both of the shafts 61a or on only one of the shafts 61a.

Figure 13:
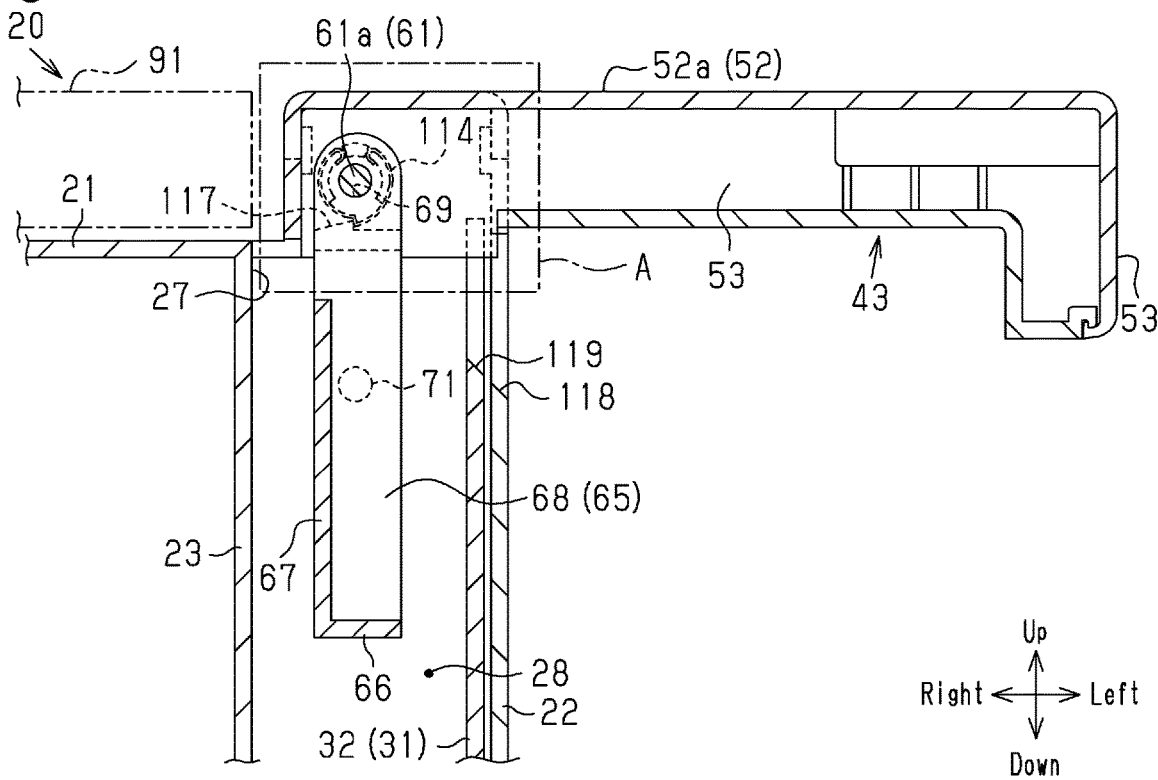
FIG. 13 is a partial, cross-sectional view showing a second embodiment of the console box when the side table is located at the usage position.
Figure 15:
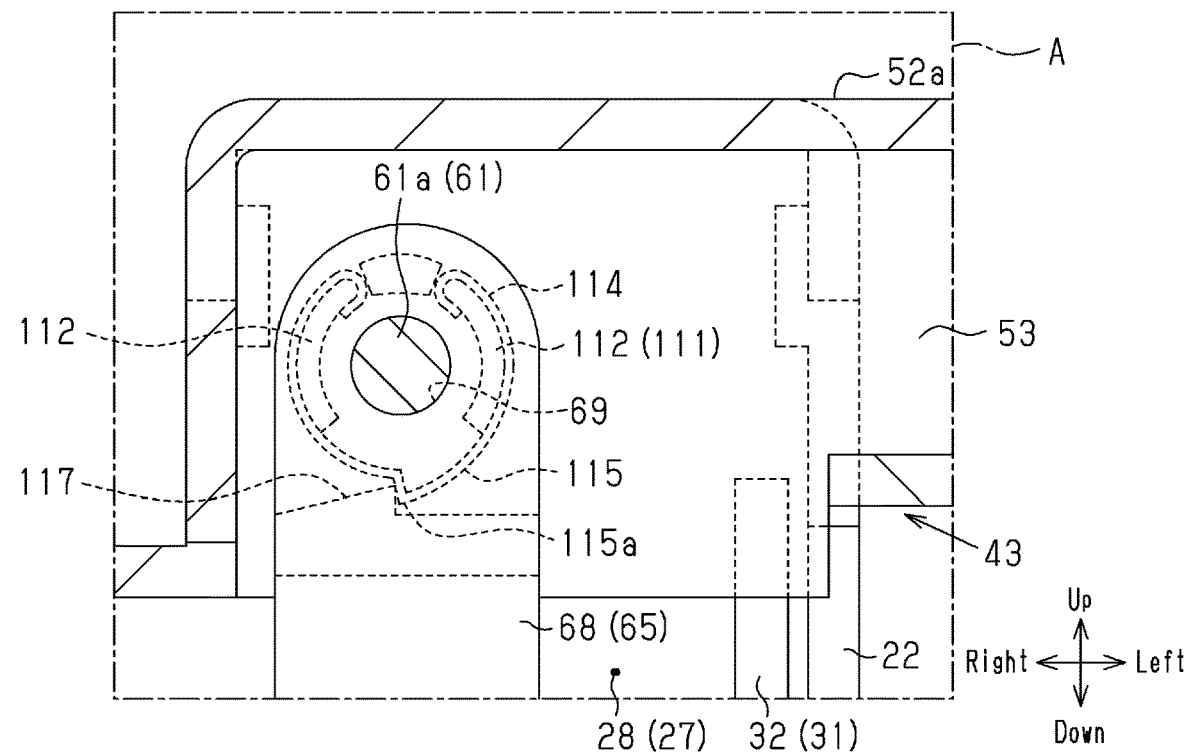
FIG. 15 is an enlarged cross-sectional view of portion A shown in FIG. 13.

As shown in FIGS. 13 and 15, each side plate 53 of the side table 43 includes a spring seat 111 formed near the corresponding shaft 61a. The spring seat 111 includes two curved portions 112 arranged at opposite sides of the shaft 61a and bulged outward in the radial direction. The lower ends of the two curved portions 112 are separated from each other in the circumferential direction.

The spring 114 is C-shaped and set on the spring seat 111 in a state encompassing the two curved portions 112 so as to be rotatable integrally with the spring seat 111.

The engagement portion 117 is formed on the corresponding opposing plate 68 of the retainer 65 at a position located outward from the spring seat 111 in the radial direction of the shaft 61a. The engagement portion 117 projects toward the shaft 61a and has an acute distal end.

The portion of the spring 114 between the lower ends of the two curved portions 112 in the circumferential direction defines an elastic deformation portion 115 that is elastically deformable in the radial direction of the shaft 61a. The elastic deformation portion 115 includes a projection 115a that projects outward in the radial direction of the shaft 61a.

The elastic deformation portion 115 is deformed elastically in order to move the projection 115a over the engagement portion 117 by applying a load to the side table 43 that is smaller than the load applied to the side table 43 in the first embodiment.

Figure 14:
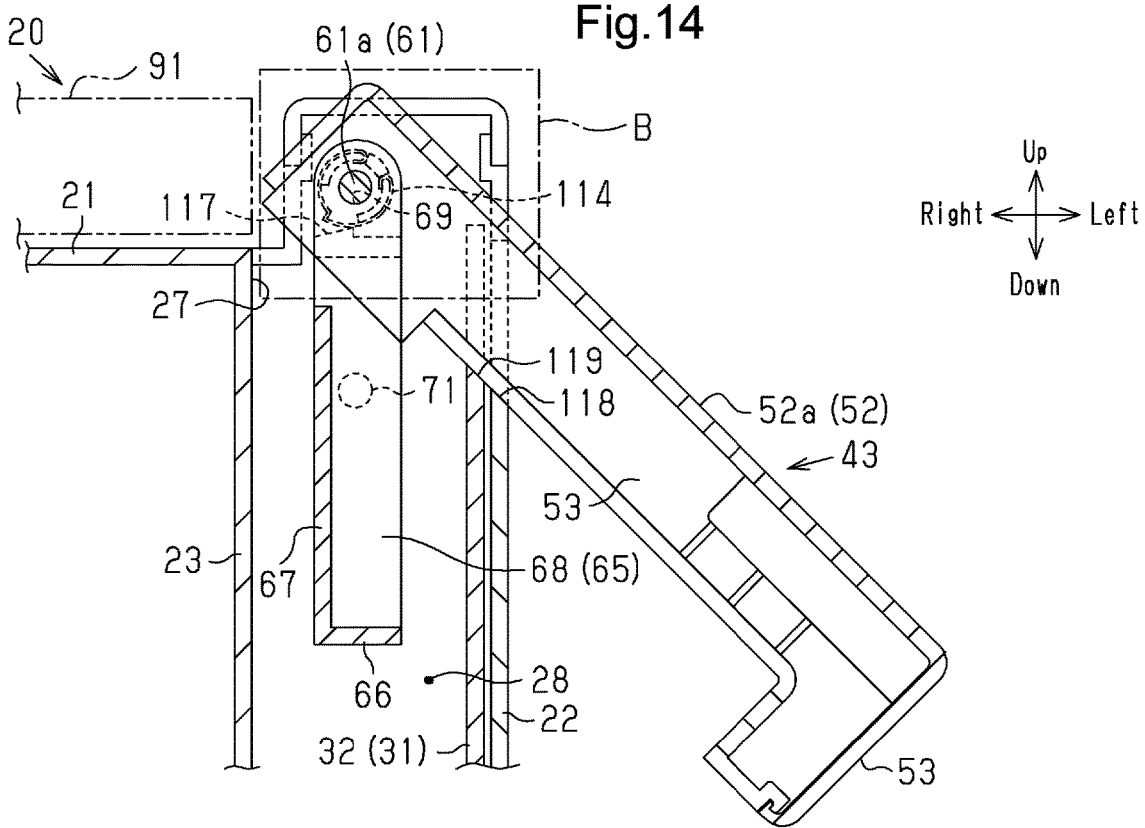
FIG. 14 is a partial, cross-sectional view of the side table in a state rotated downward from the position shown in FIG. 13.

As shown in FIGS. 13 and 14, the upper portion of the outer side wall 22 at the storage 28 includes a cutout portion 118. The body plate 32 of the bracket cover 31 also includes a cutout portion 119. The bottom of each of the cutout portions 118 and 119 is located at a lower position than the bottom of the cutout portion 39 (rotation stopper 39a).

Otherwise, the structure of the second embodiment is the same as the first embodiment. Thus, like or the same reference numerals are given to those components that are the same as the corresponding components of the fourth embodiment. Such components will not be described.

The second embodiment has the advantages described in paragraphs (1-1), (1-2), (2-1) to (2-3), (2-6), (3-1) to (3-6), and (4-1). In the second embodiment, the side table 43 can be rotated beyond the usage position. Thus, the second embodiment also has the advantage described below. The operation and advantage described in paragraph (2-4') corresponds to paragraph (2-4), and the advantages described in paragraphs (2-7) and (2-8) are unique to the second embodiment.

(2-4') When moving the side table 43 from the intermediate position to the usage position, the side table 43 is rotated about the shafts 61a. As the side table 43 rotates, the spring 114 rotates together with the side table 43 about the shaft 61a. As shown in FIGS. 13 and 15, when the side table 43 is rotated to the usage position, the projection 115a in the elastic deformation portion 115 of the spring 114 engages (contacts) the engagement portion 117 of the retainer 65. The engagement restricts rotation of the side table 43 beyond the usage position. The elastic deformation portion 115 will remain engaged with the engagement portion 117 and keep the side table 43 at the usage position as long as the load applied to the working surface 52a of the side table 43 is small and not enough to move the projection 115a beyond the engagement portion 117.

This forms an area for performing a simple task. Thus, the vehicle occupant can perform a simple task on the working surface 52a of the side table 43 while sitting on the automobile seat 13.

Figure 16:
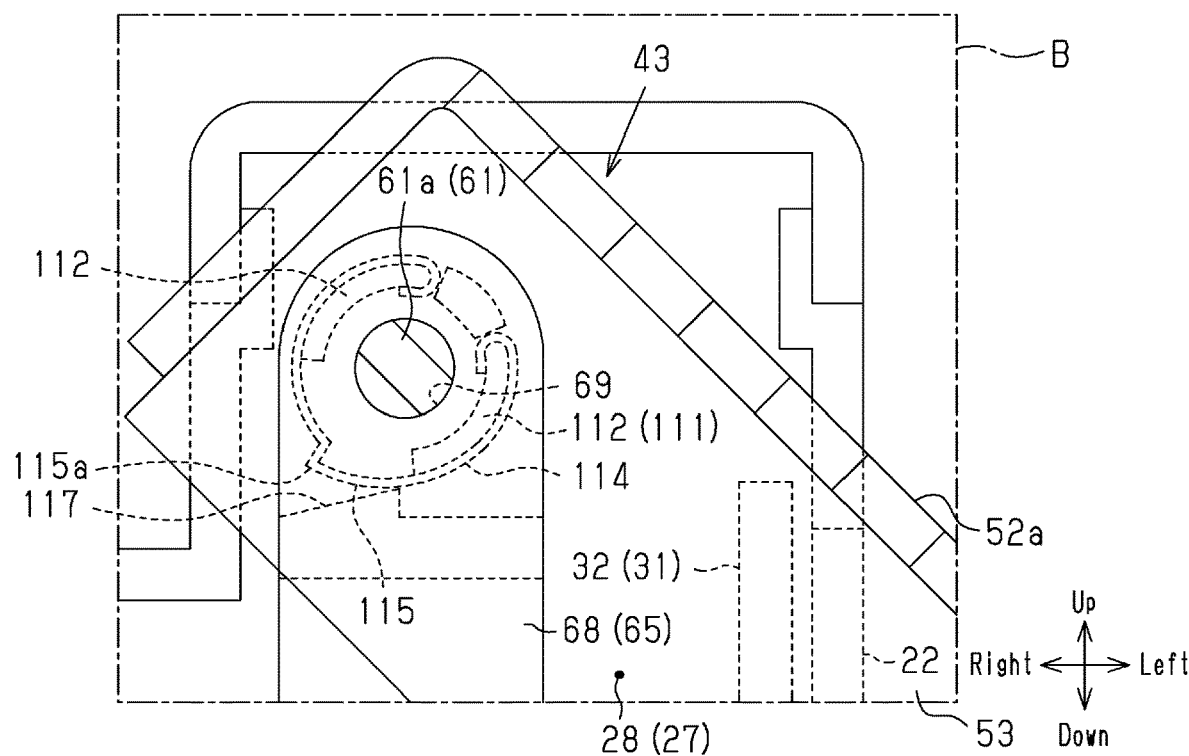
FIG. 16 is an enlarged cross-sectional view of portion B shown in FIG. 14.

(2-7) When a load applied to the side table 43 from the working surface 52a is large enough to move the projection 115a over the engagement portion 117, the elastic deformation portion 115 is deformed elastically as shown in FIGS. 14 and 16. When the elastic deformation portion 115 deforms elastically in the radial direction of the shaft 61a, the projection 115a is disengaged from and moved over the engagement portion 117. Thus, the engagement portion 117 will no longer restrict rotation of the spring 114. In this case, the side table 43 can be rotated beyond the usage position. When the projection 115a moves over the engagement portion 117, the elasticity of the elastic deformation portion 115 returns it to its original form.

Contact of the side table 43 with the bottom of at least one of the cutout portions 118 and 119 restricts downward rotation of the side table 43.

(2-8) When the side table 43, which has been rotated beyond the usage position, is rotated in the opposite direction, the actions of the elastic deformation portion 115 described above are reversed. The elastic deformation portion 115 is elastically deformed again to permit reversed rotation of the side table 43. This allows the side table 43 to be moved to the usage position or the intermediate position.

In addition to the advantages described above, the second embodiment has the advantage described below.

(4-2) In the second embodiment, the projection 115a can be moved over the engagement portion 117 by applying a load to the side table 43 that is smaller than the load applied to the side table 43 in the first embodiment.

Thus, when the applied load is the same as the load applied in the first embodiment, the side table 43 can be moved downward from the usage position. Such a load will not deform portions of the console box 20 such as the shaft supports 35 and a rotation stopper. In other words, members having high strength will avoid deformation of the shaft support 35, the rotation stopper, and the like. This allows the cost of the console box 20 to be reduced.

The above embodiments may be modified as described below. The above embodiments and the modified examples described below may be combined as long as there is no technical contradiction.

The center table 91 may be fixed to the hinge 75. In this case, when the hinge 75 is located at the closed position, the center table 91 will be positioned in the opening 27 of the box body 21. Further, the upper surface of the center table 91 is positioned to be flush with the working surface 52a of the side table 43 at the usage position. This will also allow the working area to be expanded by the center table 91.

The armrest 95 may be fixed to the hinge 75.

The center table 91 can be omitted. In this case, working area can be formed by the side table 43.

There may be only one rail. Alternatively, there may be three or more rails.

The retainer 65 may be omitted.

To form a working area with the console box 20, when the side table 43 is located at the storage position, at least one of the center table 91 and the armrest 95 may be moved to the extended position.

The console box of the present disclosure may be applied to a vehicle other than an automobile.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A console box set between adjacent vehicle seats, the console box comprising:
   a box body;
   storage located in a side portion of the box body with respect to a widthwise direction of the vehicle seats and including an upper end with an opening;
   a side table including a surface defining a working surface, wherein the side table is vertically movable between a storage position where the side table is stored in an upright state and an intermediate position where the side table is exposed upward from the storage in the upright state;
   a shaft located at a lower end of the side table when in the upright state, wherein the shaft extends in a front-rear direction of the vehicle seats;
   a shaft support arranged above the storage, wherein the shaft support rotatably supports the shaft so that the side table rotates about the shaft away from the box body in the widthwise direction from the intermediate position to a usage position where the working surface faces upward; and
   a rotation stopper that restricts rotation of the side table beyond the usage position, wherein:
   the side table includes a table bracket having a contact surface;
   the console box further includes a bracket cover disposed in the storage, the bracket cover including the shaft support and the rotation stopper;
   the shaft support contacts the shaft at the intermediate position and the usage position to rotatably support the shaft;
   the rotation stopper contacts the contact surface at the usage position to restrict rotation of the side table; and
   the bracket cover is fixed in the storage.

2. The console box according to claim 1, wherein:
   the table bracket is formed from sheet metal; and
   the bracket cover is formed from sheet metal.

3. The console box according to claim 1, further comprising:
   a vertically movable retainer disposed in the storage, the retainer assisting vertical movement of the side table between the storage position and the intermediate position, and the retainer assisting rotation of the side table between the intermediate position and the usage position,
   wherein the retainer includes an upper end coupled by the shaft to the side table in a foldable manner.

4. The console box according to claim 3, further comprising:
   a vertical rail arranged in the storage and including a vertical guide groove extending in a vertical direction, wherein the retainer includes a pin moved vertically in the vertical guide groove.

5. A console box set between adjacent vehicle seats, the console box comprising:
   a box body;
   storage located in a side portion of the box body with respect to a widthwise direction of the vehicle seats and including an upper end with an opening;
   a side table including a surface defining a working surface, wherein the side table is vertically movable between a storage position where the side table is stored in an upright state and an intermediate position where the side table is exposed upward from the storage in the upright state;
   a shaft located at a lower end of the side table when in the upright state, wherein the shaft extends in a front-rear direction of the vehicle seats;
   a shaft support arranged above the storage, wherein the shaft support rotatably supports the shaft so that the side table rotates about the shaft away from the box body in the widthwise direction from the intermediate position to a usage position where the working surface faces upward;
   a rotation stopper that restricts rotation of the side table beyond the usage position; and
   a vertically movable retainer disposed in the storage, the retainer assisting vertical movement of the side table between the storage position and the intermediate position, and the retainer assisting rotation of the side table between the intermediate position and the usage position, wherein:
   the retainer includes an upper end coupled by the shaft to the side table in a foldable manner;
   the rotation stopper includes a spring that surrounds the shaft and rotates integrally with the side table about the shaft, and an engagement portion arranged on the retainer outward from the spring in a radial direction of the shaft; and
   the spring includes an elastic deformation portion that contacts the engagement portion at the usage position to restrict rotation of the side table beyond the usage position, and elastically deforms in a radial direction of the shaft and moves beyond the engagement portion to permit rotation of the side table.

6. The console box according to claim 1, wherein:
   the side table closes the opening at the usage position;
   the console box further comprises a center table arranged on the box body at a location adjacent to the opening in the widthwise direction; and
   the center table includes an upper surface that is flush with the working surface of the side table at the usage position.

7. The console box according to claim 6, wherein the center table is slidable in the front-rear direction relative to the box body.

8. The console box according to claim 7, further comprising:
   an arm rest disposed above the center table of the box body, wherein the arm rest is slidable in the front-rear direction and covers at least a rear end of the center table from above.

9. The console box according to claim 8, further comprising:
   a hinge arranged on the box body,
   wherein the center table and the arm rest are each coupled to the hinge in a manner so as to be slidable in the front-rear direction.

* * * * *